United States Patent [19]

Colley et al.

[11] Patent Number: 5,128,200
[45] Date of Patent: Jul. 7, 1992

[54] ANISOTROPIC COMPOSITE MATERIAL HAVING AN ELASTOMER MATRIX

[75] Inventors: Robert Colley; Fabrice Lecouturier, both of Decize; Christian Ledevehat, Clermont-Ferrand, all of France

[73] Assignee: Caoutchouc Manufacture et Plastiques, Versailles, France

[21] Appl. No.: 461,362

[22] Filed: Jan. 5, 1990

Related U.S. Application Data

[62] Division of Ser. No. 276,264, Nov. 25, 1988, Pat. No. 4,936,814.

[30] Foreign Application Priority Data

Nov. 24, 1987 [FR] France ............................ 8716235

[51] Int. Cl.⁵ .............................................. B32B 25/02
[52] U.S. Cl. .................................... 428/303; 428/224; 428/245; 428/258; 428/288; 428/290; 428/36.1; 428/114
[58] Field of Search ............... 428/295, 288, 290, 258, 428/224, 245, 36.1, 303; 264/108

[56] References Cited

U.S. PATENT DOCUMENTS

| | | | |
|---|---|---|---|
| 4,056,591 | 11/1977 | Goettler et al. | 264/108 |
| 4,127,039 | 2/1978 | Holloway, Jr. | 74/232 |
| 4,571,230 | 2/1986 | Woodland | 474/264 |
| 4,657,526 | 4/1987 | Tangorra et al. | 474/261 |
| 4,681,558 | 7/1987 | Rausch | 474/205 |
| 4,684,569 | 8/1987 | McGee, Jr. | 428/286 |

Primary Examiner—Ellis P. Robinson
Assistant Examiner—Richard P. Weisberger
Attorney, Agent, or Firm—Thomas N. Ljungman

[57] ABSTRACT

A composite material includes an elastomer matrix forming a basic component of the material. There is included a cross-linking system of the elastomer matrix and at least one fiber reinforcement including fibers with a maximum length of about 30 mm. The fibers are disposed throughout the elastomer matrix and are generally oriented to extend in a first direction of reinforcement. There is at least one thermosetting resin in the elastomer matrix. The elastomer matrix which includes the cross-linking system, the fiber reinforcement and the thermosetting resin has a first equivalent tensile modulus which is calculated for a hypothetical elongation of 100% in the first direction and a second equivalent tensile modulus which is calculated for an actual or hypothetical elongation of 100% in a second direction which is perpendicular to the first direction. A second equivalent tensile modulus is at least 6 MPa. Anisotropy ratio of the first equivalent tensile modulus and the second equivalent tensile modulus is at least 6.

15 Claims, 3 Drawing Sheets

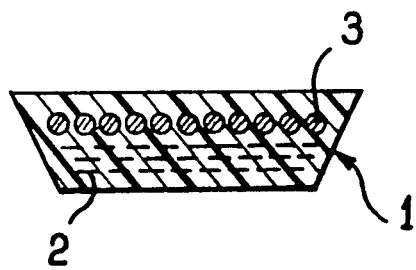
FIG_1
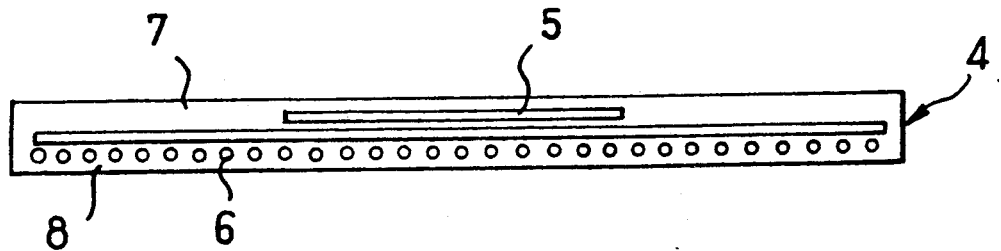
FIG_2
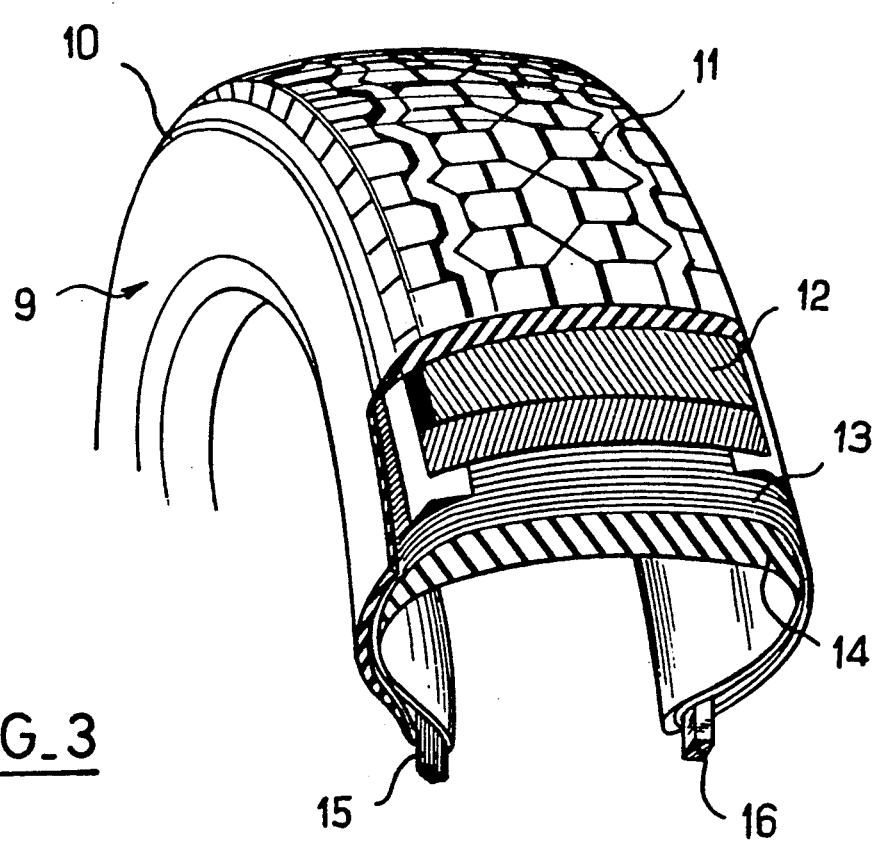
FIG_3

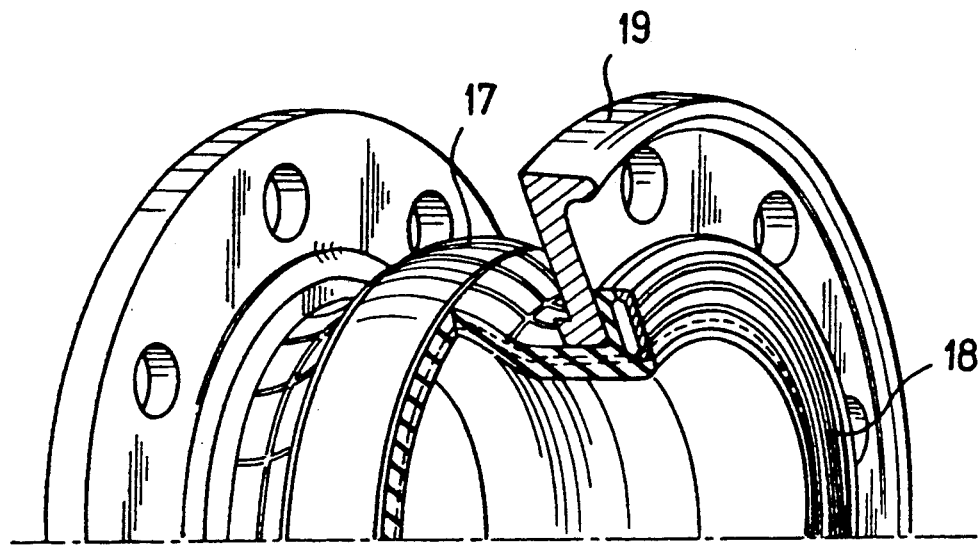
FIG_4
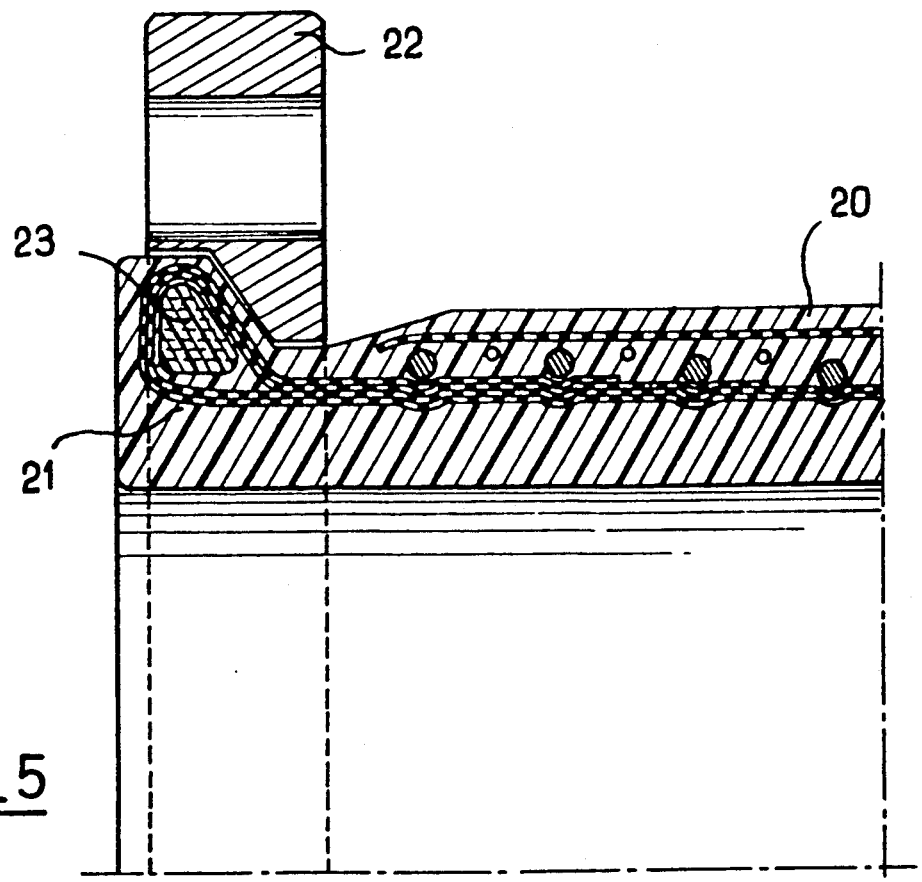
FIG_5

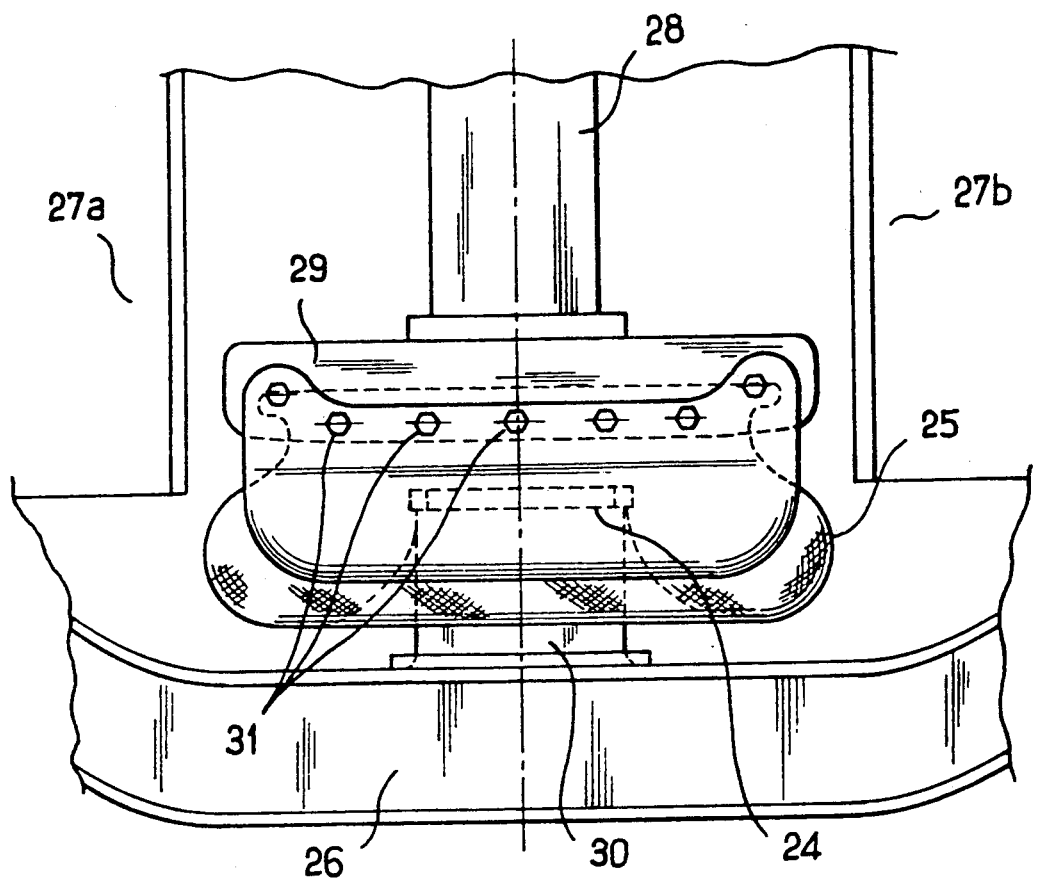
FIG_6
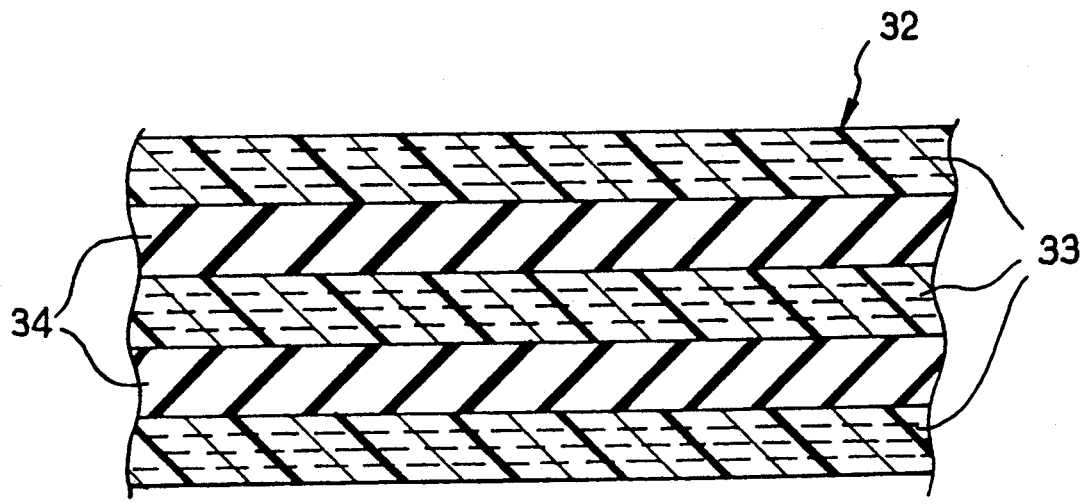
FIG_7

ANISOTROPIC COMPOSITE MATERIAL HAVING AN ELASTOMER MATRIX

This is a division of application Ser. No. 07/276,264, filed Nov. 25, 1988 now U.S. Pat. No. 4,936,814.

BACKGROUND OF THE INVENTION

1. Field of the Invention

This invention relates to a composite material having an elastomer matrix which can be used as a semi-finished product in the rubber industry and, in particular, to such an elastomer composite material which is anisotropic and has a high modulus of elasticity in one direction and a great flexibility in the direction which is perpendicular thereto.

2. Description of the Prior Art

With the technical evolution of the industries in which they are used, rubber articles increasingly require advanced mechanical and thermal performance levels. It is quite apparent that such a level of performance can only be achieved by composite systems, i.e., materials whose elastomer matrix is reinforced by powder fillers, textiles or continuous or discontinuous metal elements, for example. Composite materials with elastomer matrices have for some years experienced considerable growth in all industrial fields. Such elastomer matrices, in addition to being capable of being formed into complex shapes, have beneficial characteristics at a moderate cost, as long as their mechanical properties are improved by the incorporation of a reinforcement material. Such reinforcement material may be either in the form of a mineral or organic filler (such as carbon black) or in the form of a continuous or discontinuous reinforcement manufactured from textile or metal wires (such as in tires, hoses or conveyor belts, for example).

There are numerous publications on the general subject of elastomer matrix composites. However, it should be noted that it is rather difficult to provide materials which are highly anisotropic with elastomer compound matrices by using a reinforcing material in powder form or in the form of short fibers, since mixing techniques tend to disperse the reinforcement in a homogeneous manner in the elastomer compound.

Nevertheless, elastomer matrix composites with a high modulus and high degree of anisotropy are discribed in French Pat. No. 2,162,691, and in French Continuation Pat. No. 2,211,941 by Kleber Colombes. In the materials disclosed therein, the filler, initially in powder form, consists of high molecular weight polyethylene grains. As a result of hot homogeneous mixing between the rolls of a calender, there is an in-place fibrillation of the polyethylene grains and an alignment of the fibrils in a preferred direction. The nature of the filler, therefore, leads to a high modulus and the calendering process causes anisotropy.

Likewise, U.S. Pat. No. 4,056,591 by MONSANTO proposes the formation of anisotropic hoses made of an elastomer matrix composite reinforced with short fibers which are oriented during the composite extrusion process.

The subsequent processing of these composites for the production of manufactured articles tends—because of the necessary thermal processes—to reduce the anisotropy of the material.

On the other hand, materials with a high modulus in one direction and a high degree of anisotropy are easily provided from an elastomer matrix and a continuous reinforcement, in the form of ply, consisting of textile or metal cables. These materials are currently used, for example, in the rubber transformation industry, for the fabrication of hoses, tires, transmission belts and conveyor belts.

Nevertheless, these composites exhibit, in the directions perpendicular to that of the reinforcement, much lower mechanical properties than in the reinforcement direction which are those of the matrix, and, therefore, require the utilization of multi-layer combinations for multi-directional uses.

It should be noted that French Pat. Nos. 2,162,691 and 2,211,941 where combined for prosecution purposes in the United States and resulted in U.S. Pat. No. 4,005,054. All of the above-mentioned patents are incorporated herein by reference as if the entire contents thereof were fully set forth herein.

OBJECT OF THE INVENTION

The object of the invention is to provide an elastomer matrix composite material having improved characteristics not only in the preferred direction of the reinforcement but also in the direction at right angles to that of the reinforcement and simultaneously retaining a high degree of anisotropy between the direction of the reinforcement and the all other directions.

Another object of the invention is to include such compounds which are more economical and easier to process for the production of manufactured articles.

SUMMARY OF THE INVENTION

These and other objects of the invention are provided in a preferred embodiment thereof in the form of a composite material including an elastomer matric forming a base of material. There is included a cross-linking system of the elastomer matrix and at least one fiber reinforcement including fibers with a maximum length of about 30 mm. The fibers are disposed throughout the elastomer matrix and are generally oriented to extend in a first direction of reinforcement. There is at least one thermosetting resin in the elastomer matrix. The elastomer matrix which includes the cross-linking system, the fiber reinforcement and the thermosetting resin has a first equivalent tensile modulus which is calculated for a hypothetical elongation of 100% in the first direction and a second actual or equivalent tensile modulus which is calculated for a hypothetical elongation of 100% in a second direction which is perpendicular to the first direction. A second equivalent tensile modulus is at least 6 MPa. Anisotropy ratio of the first equivalent tensil modulus and the second equivalent tensile modulus is at least 6.

To simplify the explanation of the invention, the properties of the elastomer matrix composite material are defined as follows:

- the "equivalent tensile modulus" is the value of the tensile modulus, under a hypothetical elongation of 100% (a value which cannot be reached physically). The equivalent tensile modulus is calculated by extrapolation from the value of the actual modulus, measured at an elongation of 4%;
- the "anisotropy ratio" is the ratio of the equivalent tensile modulus in the direction of the reinforcement to the actual or equivalent tensile modulus in a direction at right angles thereto;
- the "detachment or separating tension" is force or stress at which there is a rupture or detachment of the adhesive bond between the reinforcement and the elastomer matrix. The reinforcement then loses its effectiveness, since any force applied to the composite material is exerted on the elastomer matrix.

The invention is not only directed to the elastomer matrix composite material, with a high modulus and high anisotropy, but also to its applications.

The elastomer matrix composite material which is the object of the invention is characterized by the fact that its tensile modulus at 100% in the direction perpendicular to that of the reinforcement is at least 6 MPa (megapascals), accompanied by an anisotropy ratio of at least 6.

These high levels of mechanical properties, both in the direction of the reinforcement and in a direction perpendicular thereto, are obtained by incorporation in the elastomer matrix of at least one reinforcement element, preferably comprising textile or metal fibers with a maximum length of about 30 millimeters, and at least one thermosetting resin with or without its cross-linking agent.

Consequently, the composite material which is the object of the invention comprises at least the following components:

an elastomer constituting the basic element of the matrix, with its cross-linking or vulcanizing system,
a reinforcement consisting of short fibers, and
a thermosetting resin.

BRIEF DESCRIPTION OF THE DRAWINGS

FIG. 1 is a simplified, sectional view of a typical transmission belt including the preferred elastomer matrix composite material with a high modulus and high degree of anisotropy.

FIG. 2 is a simplified, sectional view of a preferred conveyor belt comprising a layer of anisotropic composite material as a reinforcement element.

FIG. 3 is a fragmentary, perspective view partially in section of a tire including the preferred anisotropic composite material.

FIG. 4 is a fragmentary, perspective view partially in section of the bead of an integrated flange of an expansion compensation sleeve including the preferred anisotropic composite material in its bead.

FIG. 5 is a fragmentary, sectional view of the bead of an integrated flange of a flexible hose including the preferred anisotropic composite material.

FIG. 6 is a fragmentary, lateral view of a protector for a pneumatic suspension membrane including the preferred anisotropic composite material.

FIG. 7 is a fragmentary, sectional view of a stratified composite material of the invention which is capable of being used as a protection against impacts, in particular, impacts by ballistic projectiles.

DESCRIPTION OF THE PREFERRED EMBODIMENTS

The preferred embodiments of the invention, its variants and its applications are described in greater detail with reference to the accompanying figures and to non-limiting examples, in which:

Example 1 describes the basic content of the anisotropic composite material,

Example 2 is a formulation based on a synthetic elastomer, polychloroprene, accompanied by its mechanical properties, Example 3 is a formulation based on another synthetic elastomer, a terpolymer of ethylene, propylene and a diene termonomer, accompanied by its mechanical properties, and Example 4 is a formulation based on natural rubber, accompanied by its mechanical properties.

EXAMPLE 1

A standard formulation of the preferred anisotropic composite material with an elastomer matrix includes some or all of the ingredients listed below. The proportions are indicated in parts by weight for 100 parts by weight of elastomer:

| | |
|---|---|
| natural or synthetic elastomer | 100 |
| system of anti-oxidation additives | from 2 to 7 |
| system of processing aids and/or softening agents | from 3 to 100 |
| elastomer cross-linking system | from 8 to 15 |
| thermosetting resin | from 3 to 30 |
| cross-linking agent for the resin | from 0 to 10% of resin weight |
| reinforcing powdered filler | from 0 to 200 |
| reinforcement fibers | from 5 to 50 |

The proportions of these various components, in particular, of the powdered filler and of the processing aids and/or softening agents, depend upon the nature of the elastomer. In particular, formulations based on a terpolymer of ethylene, propylene and a termonomer would allow the use of very high proportions of processing aids and/or softening agents and fillers.

The basic component of the matrix includes at least one natural or synthetic elastomer such as, by way of non-limiting examples, natural rubber; polyisoprene or a higher homolog; SBR (Styrene-Butadiene Rubber); polychloroprene; halogenated polyethylene; a copolymer of butadiene and acrylonitrile or one of its hydrogenated forms; a copolymer of isoprene and isobutylene or one of its halogenated forms; a copolymer of ethylene and propylene; a terpolymer of etyhylene, propylene and a diene termonomer; or a silicon elastomer. According to their compatibility, different elastomers can be combined, in various proportions, to form the basic component of the matrix.

The system of anti-oxidation additives can be of a conventional type which is used in the rubber transformation industry and may include, for example, aromatic amines alone or in combination with other ingredients.

The system of processing aids and/or softening agents generally includes at least one paraffinic, naphthenic or aromatic oil, which may be combined with a wax or any other processing aid.

The cross-linking or vulcanizing system of the elastomer is appropriate to the nature of said elastomer and, generally, comprises zinc oxide, stearic acid, one or more accelerators and a cross-linking agent. Other cross-linking systems such as those with organic peroxides can also be used.

Cross-linking refers to the formation of primary bonds between linear polymer molecules which results in either reduced solubility and higher softening temperature or complete insolubility and infusibility. The cross-linking operation using sulfur is known as vulcanization.

Since there are broad differences associated with the various types of rubber or polymer, it must be realized that starting with any one polymer, vulcanized products may be made with a very wide range of properties. The main purpose of vulcanization is to link up the separate polymer molecules into a continuous three-dimensional network, in fact into one enormous molecule. Technically, the result of vulcanization is to convert the essentially plastic raw rubber into an essentially elastic vulcanizate having very little plastic flow, and also to make it insoluble in liquids which would dissolve the unvulcanized material.

Vulcanization is usually effected by mixing into the rubber a small amount of sulphur (1-5%) and heating at a temperature between 120° and 190° C. A so-called accelerator is generally added to reduce the necessary heating period or the temperature. Other vulcanizing agents, such as organic peroxides, are used for special purposes and for certain synthetics.

The more vulcanizing agent used, and hence the denser the cross-linking of the molecules, the stiffer is the resulting rubber. However, in practice the stiffness or elastic modulus is more readily modified by adding fillers, reinforcing agents or plasticizers.

The elastomer compound can also have an adherence promoter system, of the RFS type, designed to promote in-place adherence between the fibrous reinforcement and the elastomer compound and/or between the elastomer matrix composite and a textile or mental reinforcement—e.g. continuous—of the article to be manufactured.

The RFS adherence promotion system refers to Resorcinal-Formal-Systems which are widely used for in-situ bonding of rubber compounds to textile and to metal. For example, products sold under the trade name COHEDUR by Bayer can be used for such systems. Such systems are described in "Manual for the Manufacture of Rubber" (Manuel pour l'industrie du Caoutchouc) published by Bayer AG, Leverkusen, Germany (1972 edition) which is incorporated by reference herein.

The thermosetting resin used is generally of the formophenol type, and is preferably one of the types including urea/formol, melamine/formol or resorcinol/-formol. Epoxy or polyester resins can also be used.

The cross-linking agent for the resin is generally an amine which is used in approximately 10% by weight of the quantity of resin. The presence of the cross-linking agent of the thermosetting resin is not mandatory in the elastomer based mixture.

The powdered reinforcing filler is preferably selected from the vast range of carbon blacks or transparent fillers such as silica.

The fibrous reinforcement comprises natural, artificial or synthetic textile or metal fibers, the lengths of which do not generally exceed about 20 millimeters. The textile fibers most frequently used are cotton or silk for natural fibers; spun rayon or regenerated cellulose for artificial fibers; or polyamide, polyester, aramid, polyacrylonitril, polyvinyl alcohol or polyolefins for synthetic fibers. To obtain a very high modulus, it is also possible to use glass, metal, boron or carbon fibers.

EXAMPLE 2

A Composition 2 and the mechanical properties thereof can be compared with a reference mixture, called Reference 2, with the same formulation, except for the thermosetting resin and the fiber reinforcement being omitted.

Composition 2 includes a synthetic elastomer based formulation, polychloroprene, with a conventional cross-linking or vulcanizing system, comprising magnesia, stearic acid and zinc oxide. The system of processing and/or softening agents comprises naphthenic oil, and the powdered filler is carbon black. The fiber reinforcement comprises polyester fibers approximately 5 mm long, and the thermosetting resin is a formo-phenol resin.

The components by weight of Composition 2 are indicated below:

| Composition 2 | |
|---|---|
| Components | Proportions by weight |
| Sulfur-modified polychloroprene | 100.00 |
| Stearic acid | 0.50 |
| Zinc oxide | 5.00 |
| Magnesium oxide | 4.00 |
| Ethylene-thio-urea | 0.60 |
| Anti-oxidants | 2.50 |
| Naphthenic oil | 10.00 |
| HAF black* | 70.00 |
| Formophenol resin | 20.00 |
| Hexamethylene tetramine | 2.00 |
| Polyester fiber | 20.00 |

*HAF is the symbol for special grades of carbon-black fillers which are defined in ASTM-D 1765-68 as cited on page 771 of the above-mentioned "Manual for the Manufacture of Rubber" by Bayer.

The mechanical properties listed below are measured in the direction of the reinforcement and in a direction which is perpendicular thereto. They are given by comparison with those of Reference 2 and those of an above-referenced high-modulus example of the prior art (Example III in French Continuation Pat. No. 2,211,941), a composite which exhibits the highest characteristics but which is cited only by way of information, since it does not include the same base polymer.

| Property | Ref. 2 | Composition 2 Reinf. Direction | Composition 2 Perpend. Direction | Example III Prior art Reinf. Direction | Example III Prior art Perpend. Direction |
|---|---|---|---|---|---|
| 100% modulus MPa (real or equivalent) | 4.8 | 350 | 19 | — | 5 |
| Tension at 4% MPa | — | 8.2 | — | — | — |
| Tension at 50% MPa | 2.7 | — | 7 | — | — |
| Separating tension MPa | — | 25.7 | — | — | — |
| Separating elongation % | — | 17 | — | — | — |
| Ultimate strength MPa | 19 | — | 7.1 | 116 | 12 |
| Elongation at break % | 480 | — | 58 | 9.7 | 420 |
| Anisotropy | Near 1 | 18.4 Calculated on the basis of moduli at 100% | | 9.7 Calculated on the ultimate strengths | |

This table shows that Composition 2 exhibits a very high degree of anisotropy which is almost double that of the composition of the prior art; an equivalent modulus of 350 MPa; and a modulus at 100% in the direction perpendicular to that of the reinforcement which is almost four times higher than that of the composition of the prior art. In comparison with Reference 2, the ratio of the moduli is almost 73 in the direction of the reinforcement and almost 4 in the perpendicular direction.

The values of the ultimate strength and of the elongation at break for Composition 2 in the direction of the reinforcement are not indicated because they have no physical significance, since the detaching or separating of the fiber reinforcement occurs before the rupture of the composite material but under a tension having a magnitude as high as more than 25 MPa. The mechanical characteristics of Composition 2 include a high modulus in both directions and a high degree of anisotropy.

EXAMPLE 3

A Composition 3 and the mechanical properties thereof can be compared with a reference mixture, called Reference 3 with the same formulation except for the thermosetting resin and the fiber reinforcement, being omitted from the formulation of Reference 3.

Composition 3 is a formulation based on a synthetic elastomer, which is a terpolymer of ethylene, propylene and a diene termonomer (which is called EPDM rubber in the elastomer art), with a conventional sulfur accelerator. The softening system, in an altogether conventional manner, comprises paraffin oil, and the powdered filler is carbon black. The fiber reinforcement is polyamide 8 mm long, and the thermosetting resin is a formo-phenol resin accompanied by its cross-linking agent, hexamethylene tetramine.

The components of Composition 3 by weight are indicated in the following table:

| Component | Composition 3 Proportions by weight |
|---|---|
| EPDM | 100.00 |
| HAF black | 80.00 |
| Stearine | 1.50 |
| Zinc oxide | 5.00 |
| Sulfur | 2.00 |
| M.B.T.S.* | 1.00 |
| T.M.T.D.** | 0.50 |
| Paraffin oil | 50.00 |
| Formo-phenol resin | 15.00 |
| Hexamethylene tetramine | 1.50 |
| Polyamide fiber | 15.00 |

*M.B.T.S. means Mercapto-Benzo-Thiazyl Sulfenamide which is used as a vulcanization accelerator. For example, one could use a product sold under the tradename of VULKACIT AZ by Bayer as defined on page 304 of the above-mentioned "Manual for the Manufacture of Rubber".

*T.M T.D means Tetra-Methyl Thiuram Disulfide which is used as a vulcanization accelerator. For example, one could use a product sold under the tradename of VULKACIT THIURAM by Bayer as defined on page 320 of the above-mentioned "Manual for the Manufacture of Rubber".

It should be noted that this formulation has very high concentrations of carbon black and paraffin oil compared to the formulations of Compositions 2 and 4. Such quantities are familiar to those skilled in the art for compositions based on EPDM rubber.

The mechanical properties summarized below are measured in the direction of the reinforcement and in the perpendicular direction. They are compared to those of Reference 3, which has the same formulation as the elastomer Composition 3, with the exception of the polyamide fiber and the thermosetting resin.

The table also indicates the mechanical characteristics of the high-modulus composition of the prior art noted above (i.e. Example III in French Continuation Patent No. 2,211,941, since it is the example having the highest modulus value). This composition of the prior art is cited only by way of information, since its matrix includes a base polymer of a type different from that of Composition 3.

| Property | Ref. 3 | Composition 3 Reinf. Direction | Composition 3 Perpend. Direction | Example III Prior art Reinf. Direction | Example III Prior art Perpend. Direction |
|---|---|---|---|---|---|
| 100% modulus MPa (real or equivalent) | 2.9 | 208 | 15.8 | — | 5 |
| Tension at 4% MPa | — | 4.9 | — | — | — |
| Tension at 50% MPa | 1.6 | — | 4.8 | — | — |
| Separating tension MPa | — | 15 | — | — | — |
| Separating elongation % | — | 15 | — | — | — |
| Ultimate strength MPa | 17.3 | — | 9.3 | 116 | 12 |
| Elongation at break % | 430 | — | 130 | 9.7 | 420 |
| Anisotropy | Near 1 | 13 Calculated on the basis of moduli at 100% | | 9.7 Calculated on the ultimate strengths | |

This table shows that Composition 3 has a high anisotropy which is equal to 1.3 times that of the composition of the prior art; an equivalent modulus higher than 200 MPa; and, above all, a modulus at 100% in the direction perpendicular to that of the reinforcement which is three times higher than that of the composition of the prior art. In comparison with Reference 3, the ratio of the moduli is almost 72 in the direction of the reinforcement and about 5.4 in the perpendicular direction.

The values of the ultimate strength and of the elongation at break for Composition 3 in the direction of the reinforcement are not indicated because they have no physical significance, since the detaching or separating of the fiber reinforcement occurs before the rupture of the composite material but under a tension having a magnitude as high as more than 21 MPa. The mechanical characteristics of Composition 3 include a high modulus in both directions and a high degree of anisotropy.

EXAMPLE 4

A Composition 4 and the mechanical properties thereof can be compared with a reference mixture, called Reference 4, of the same formulation, except for the thermosetting resin and the fiber reinforcement, being omitted from the formulation of the reference mixture.

Composition 4 is a natural rubber base formulation with a well-known, sulfur-based cross-linking or vulcanizing system. The softening system typically comprises aromatic oil. The powdered filler is carbon black, used in the usual proportions for this type of elastomer. The fiber reinforcement used is aromatic polyamide, which is a high-modulus fiber about 5 mm long. The thermosetting resin is a urea-formol resin accompanied by its cross-linking agent, hexamethylene tetramine, which is conventionally added in the amount of 10% by weight of the resin.

The components of Composition 4 by weight are indicated in the following table:

| Composition 4 | |
| --- | --- |
| Components | Proportions by weight |
| Natural rubber S.M.R. 10* | 100.00 |
| HAF black | 55.00 |
| Stearine | 1.50 |
| Zinc oxide | 5.00 |
| Aromatic oil | 7.00 |
| Urea-formol resin | 10.00 |
| Hexamethylene tetramine | 1.00 |
| Sulfur | 1.80 |
| C.B.S.** | 0.80 |
| T.M.T.D. | 0.20 |
| Aromatic polyamide fiber | 10.00 |

*S.M.R 10 refers to Standard Malaysian Rubber, grade 10.
**C.B.S means n-Cyclohexyl Benzothiazole -2- Sulfenamide which is used as a vulcanization accelerator. For example, one could use a product sold under the tradename of VULKACIT CZ by Bayer as defined on page 304 of the above-mentioned "Manual for the Manufacture of Rubber".

The mechanical properties indicated below are measured in the direction of the reinforcement and in the perpendicular direction. They are compared to those of Reference 4, with the same formulation except for the thermosetting resin and the fiber reinforcement comprising short aromatic polyamide fibers, which are obviously omitted from Reference 4.

By way of comparison, the mechanical properties of a high-modulus composition of the prior art (i.e. Example I from French Continuation Pat. No. 2,211,941) are given, where the matrix is also a natural rubber base, although the reinforcement is not of the same type. In the prior art, the polyethylene fibrils of very high molecular weight are formed in place, within the elastomer matrix, at the moment of calendering into sheets. Accordingly, the reinforcement is not, or is no longer, present in the same proportions.

| | | Composition 4 | | Example 1 Prior art | |
| --- | --- | --- | --- | --- | --- |
| Property | Ref. 4 | Reinf. Direction | Perpend. Direction | Reinf. Direction | Perpend. Direction |
| 100% modulus MPa (real or equivalent) | 3.9 | 180 | 12.7 | — | 5.9 |
| Tension at 4% MPa | — | 3.9 | — | — | — |
| Tension at 50% MPa | 2.1 | — | 3.2 | — | — |
| Separating tension MPa | — | 16 | — | — | — |
| Separating elongation % | — | 20 | — | — | — |
| Ultimate strength MPa | 25.5 | — | 13.2 | 580 | 219 |
| Elongation at break % | 525 | — | 160 | 5.5 | 340 |
| Anisotropy | Near 1 | 14.1 Calculated on the basis of moduli at 100% | | 2.6 Calculated on the ultimate strengths | |

This table shows that Composition 4 exhibits a high anisotropy which is equal to 5.4 times that of the composition of the prior art; an equivalent modulus of 180 MPa; and, above all, a 100% modulus in the direction perpendicular to that of the reinforcement which is twice as high as that of the composition of the prior art. In comparison with Reference 4, the ratio of the moduli is about 46 in the direction of the reinforcement and about 3.25 in the perpendicular direction.

The values of the ultimate strength and of the elongation at break for Composition 4 in the direction of the reinforcement are not indicated because they have no physical significance, since the detaching or separating of the fiber reinforcement occurs before the rupture of the composite material under a tension having a magnitude as high as 16 MPa. The mechanical characteristics of Composition 4 include a high modulus in both directions and a high degree of anisotropy.

The above-mentioned elastomer matrix composite materials, which are the object of the invention, can be produced by mixing the various individual ingredients, or from commercially-available master mixes, which may include combinations of an elastomer matrix and short fibers.

Regardless of which primary materials are employed, the operation of mixing the ingredients is followed by an operation intended to orient the short fibers in the matrix, such as calendering the composition into sheets or extruding the composition into a structured shape.

The process for providing the composite material therefore comprises, for example, a number of operations which are well known to the rubber transformation industry.

For the mixing operation, it is advantageous to work at low speed, in an internal mixer, to make cerain that the temperature increase is as small as possible.

To the elastomer is added a portion (approximately 50%) of the quantity of the powdered filler, followed by the thermosetting resin, the remainder of the powdered filler, the short fibers, and finally, the cross-linking system.

Each addition of an ingredient is preferred when the ingredients previously introduced have been thoroughly mixed in the elastomer.

For the calendering operation, the mixture will be reheated on a calender and drawn, hot, into thin sheets, the effect of which is to orient the short fibers within the elastomer composition.

The description of the mechanical properties obtained for some compositions, which serve as non-limiting examples, shows that the elastomer matrix compositions with a high modulus and high degree of anisotropy can be obtained by the addition of a powdered filler, a thermosetting resin and a fiber reinforcement to a natural or synthetic elastomer.

The mechanical properties of the compositions are directly related to the proportions by weight and to the intrinsic characteristics of the reinforcement components, which include, for example, the powdered filler, the fiber reinforcement and the resin. It is therefore possible, for a given elastomer, which has been selected for its qualities of resistance to abrasion, heat or oils, to include a whole range of composites with a modulus and anisotropy adapted to a particular application. FIGS. 1 to 7 illustrate, by way of non-limiting examples, some particular applications of the preferred anisotropic composite material.

FIG. 1 is directed to the application of the preferred material to transmission belts. A belt 1 is provided with a trapezoidal cross section, although it might alternatively have a rectangular, round or hexagonal cross section. The belt 1, which can be either coated or raw-edged, cogged, or toothed or plain base, is represented schematically to include two principal components, a base 2 and an armature or core 3 which may include continuous, longitudinally extending reinforcement elements, comprising textile strands or metal cables.

The base 2 is generally constituted of an elastomer composition with a formulation adapted to the stresses experienced during operation of the belt.

The formation of the base 2 of anisotropic composite material in accordance with the invention, because of the high modulus of the material, makes it possible to transmit higher powers or forces with an equal cross section. At the same time, the anisotropy is used to provide an elasticity which is suitable for passage over the pulleys. In such belts, the anisotropic composite material is preferably used so that the direction of the fiber reinforcement is perpendicular to that of the continuous reinforcement. The preferred anisotropic composite material can be used in all types of belts including smooth, ribbed, or cogged synchronous belts.

FIG. 2 is a schematic illustration of the structure of a conveyer belt 4 with a layer of anisotropic composite material. The conveyor belt 4 includes a transverse median reinforcement ply 5 and a longitudinal textile armature or core 6, which are embedded in an elastomer compound of conventional formulation to form a top coating 7 and a bottom coating 8.

In conventional high-strength configurations, the transverse median reinforcement ply 5 generally comprises metal cables. However, the utilization of a preferred anisotropic composite material instead of metal cables makes possible a simplified fabrication of the conveyor belt 4. The use of the preferred anisotropic reinforcement composite material for the transverse median reinforcement ply 5 provides body to the belt 4 because of its high modulus and, all other design and operation parameters being equal, makes it capable of handling heavier loads. On the other hand, the anisotropy of the preferred composite material gives the belt 4 the flexibility required for passage over the drums.

It will be obvious to a technician skilled in the art that the utilization of the preferred anisotropic composite material is not limited to a median reinforcement ply 5 of the conveyor belt 4 as illustrated. Depending on the particular application, it would be possible to provide a conveyor belt using one or more layers of lthe preferred anisotropic composite material to replace the conventional transverse reinforcement elements in the form of strands, textile fabrics or metal cables.

FIG. 3 illustrates the use of the preferred anisotropic composite material in the beads of tires. The sectional view of a tire 9 includes a sidewall 10, a tread 11, a ply constituting a belt 12 and a ply constituting a carcass 13 which is installed on a cushion 14. A bead 15 is formed from metal cables and represents a typical configuration found in the prior art, while a bead 16 is formed of the preferred anisotropic composite material according to the invention.

Depending on the formulation of the composite material, it is therefore possible to provide, by molding, tire beads, such as the bead 16, which are capable of replacing the beads previously made of hard rubber and steel wires. The direction of reinforcement of the bead 16 is in a generally circumferential direction similar to that of the bead 15. The preferred bead 16 would be capable of performing the same connecting functions between the tire and the rim and the same transmission of acceleration, braking and steering torques.

FIG. 4 illustrates how the preferred anisotropic composite material can be utilized in the bead of a flexible expansion compensation sleeve 17 in industrial pipe connection (not shown). The compensation sleeve 17 includes at least one integrated flange 18 which is intended to be connected to a counterflange 19. There are various techniques for mounting counterflanges 19 on the beads of the integrated flanges 18.

One such technique which can be used with rigid beads consists of installing the counterflanges 19 during fabrication of the compensation sleeve 17 before vulcanization. This technique requires the handling of the entire compensation sleeve which is heavier because of the counterflanges. Additionally, the fabrication of a given type of such compensation sleeve would require as many variants as there are sizes or types of counterflanges.

Another technique allows the flexible beads to be forcibly engaged with the counterflange after fabrication. Unfortunately, because of the extreme flexibility of such beads, the expansion sleeves of this type cannot be reliably utilized at a high internal pressure.

Finally, a third solution comprises reinforcing the beads with armatures or cores in sectors, which can be independent, linked or breakable. With the armature in sectors, it is possible to bend the bead of the flange to allow it to pass through the orifice in the counterflange during assembly.

Utilizing the preferred anisotropic composite material at least in the bead of the compensation sleeve makes it possible to avoid the use of a rigid armature or core. Because of its high modulus, the sleeve can be lighter, while retaining, due to its anisotropy, the ability of the bead to bend. This allows it to pass through the orifice of the counterflange for assembly of the counterflanges after the fabrication of a preferred expansion compensation sleeve which will nevertheless be able to resist high internal pressures during operation.

The use of the anisotropic composite material, at least in the bead of the expansion compensation sleeve 17, thus makes it possible to combine the resistance to high internal pressures with the ease of assembly of the counterflanges.

FIG. 5 illustrates the use of the preferred anisotropic composite material at the ends of a flexible hose 20 comprising an integrated flange 21 and a counterflange 22 which will be mounted thereon. The bead of the hose end is preferably reinforced by the preferred anisotropic composite material 23. It should be clear that this application offers the same advantages as those described above for the expansion compensation sleeve with an integrated flange. For both the embodiments of FIGS. 4 and 5, the preferred direction of reinforcement is generally circumferential.

FIG. 6 illustrates the use of the preferred anisotropic composite material in a protector screen 24 of vehicle pneumatic suspension membranes which are exposed to high speeds and impacts by stones. FIG. 6, which illustrates the railway application, represents what an observer from the platform would see on a train equipped with these pneumatic suspension devices 25.

A bogey frame 26 is utilized to extend between and support the extremities or ends of the coaches 27a and 27b by means of a support ring 28 which constitutes the special feature of trains where communication between coaches is possible. The support ring 28 rests on a fastening rim 29 of the flexible membrane of the pneumatic suspension device 25. The flexible membrane is capable of rolling in its vertical movements over a form of piston member 30 which is fixed to the bogey frame 26. None of these components nor the related accessories such as shock absorbers extend sufficiently to adequately screen the flexible membrane against projections of stones. As a result, a protector screen 24, which is made of the preferred anisotropic composite material, is secured by screws 31 to the rim 29 in order to protect the flexible membrane in the most vulnerable directions while allowing, in particular, unrestricted dynamic transverse deflections thereof.

the advantages of the anisotropic composite material in this application are found both in the high modulus, which offers a strong resistance to tearing from the impact of stones and in the anisotropy, which makes possible in the direction perpendicular to that of the fiber reinforcement, a flexibility which allows the dynamic transverse deflections.

FIG. 7 illustrates the constitution of a preferred stratified composite material 32 which is used as protection against impacts, and, in particular, against the impacts of ballistic projectiles. In the example shown, the stratified composite material 32 comprises three layers 33 of the preferred composite material according to the invention and two layers 34 of a highly damping, shock absorbing elastomer composition. Depending on the particular anti-impact protection desired, it may not be essential to include in the stratified composite material the shock absorbing elastomer composition layers.

The high modulus of the composite material of layers 33 resists the penetration of projectiles. If one of the layers 33 is nevertheless penetrated, the shock absorbing layers 34 will absorb the kinetic energy of the projectile to effectively prevent it from reaching the subsequent layers 33 of composite material.

The anisotropic properties of the preferred composite material of the invention are capable of being used to create a form of isotropic stratified composite material by alternating the layers 33 at different angles from one layer to the other.

It should be clear that the preferred anisotropic composite materials are obviously not limited to the several examples described above. The preferred materials are also capabe of replacing the homogeneous or reinforced elastomer compositions which are used, for example, to provide tubular bodies. For such tubular configurations, the layers could be employed in pairs at an angle of ±54° from the longitudinal axis. For other applications which heretofore utilized an elastomer matrix reinforced by a monodirectional element of multiple layers of an isotropic material, alternating layers of the preferred anisotropic composite material can be oriented at relative angles which may vary from 0 to ±90 degrees.

Without going beyond the scope of the invention, a technician skilled in the art can of course make various modifications to the composition of the preferred composite materials which have been described by way of non-limiting examples. In particular, it would be possible to make some alterations of the proportions by weight; in the type of reinforcing elements or the base elastomer; or of the cross-linking or vulcanizing system without departing from the invention.

The invention as described hereinabove in the context of a preferred embodiment is not to be taken as limited to all of the provided details thereof, since modifications and variations thereof may be made without departing from the spirit and scope of the invention.

What is claimed is:

1. A composite material comprising:
   an elastomer matrix forming the basic component of said material;
   said elastomer matrix including a cross-linking system;
   at least one fiber reinforcement means including fibers with a maximum length of about 30 mm;
   said fibers being disposed throughout said elastomer matrix and being generally oriented to extend in a first direction of reinforcement of said fibers;
   at least one thermosetting resin which is different from said elastomer matrix, in said elastomer matrix, being including to promote reinforcement of said elastomer matrix;
   said at least one thermosetting resin comprising 10 percent to 30 percent by weight of said elastomer matrix;
   one of said at least one thermosetting resin comprising essentially at least one member of the group consisting of; epoxy resin, polyester resin, urea-formal, resin, and melamine-formol resin;
   said elastomer matrix which includes said cross-linking system, said fiber reinforcement means and said thermosetting resin having a first elastic modulus for a strain substantially less than 100% in said first direction of reinforcement of said fibers and a second elastic modulus in a second direction which is perpendicular to said first direction of reinforcement of said fibers;
   said thermosetting resin being in a proportion to said fiber reinforcement means and said elastomer matrix, so that said second elastic modulus is increased to at least 6 MPa and said first elastic modulus is at least 36 MPa; and
   said fiber reinforcement means being in a proportion to said thermosetting resin and said elastomer matrix, so that an anisotropy ratio of said first elastic modulus to said second elastic modulus is at least 6 and not greater than about 18.4.

2. The composite material according to claim 1, wherein said fiber reinforcement means includes at least one of natural fibers, artificial fibers, and synthetic fibers.

3. The composite material according to claim 2, wherein said fiber reinforcement means includes said fibers being formed of at least one of cotton, silk, spun rayon., regenerated cellulose, polyamide, aromatic polyamide, polyester, polyolefin, polyvinyl alcohol, and polyacrylonitril.

4. The composite material according to claim 1, wherein said fiber reinforcement means includes at least one of metal fibers, glass fibers, boron fibers, and carbon fibers.

5. The composite material according to claim 1, further including a reinforcing filler in powder form in said elastomer matrix.

6. The composite material according to claim 1, wherein said thermosetting resin includes a cross-linking agent.

7. The composite material according to claim 1, wherein said elastomer matrix forming said basic component is in at least two layers and said at least two layers are superimposed so that said first directions of reinforcement of said at least two layers are respectively parallel.

8. The composite material according to claim 1, wherein said elastomer matrix forming said basic compoonent is in at least two layers and said at least two layers are superimposed so that said first directions of reinforcement of said at least two layers are respectively oriented to have an angle between 0 and 90 degrees therebetween.

9. The composite material according to claim 1, wherein said elastomer matrix forming said basic component is formed into a protector screen for protecting a pneumatic suspension membrane of a railroad coupling means.

10. The composite material according to claim 1, wherein said strain substawntially less than 100% of said first elastic modulus is 4%.

11. The composite material according to claim 5, wherein said reinforcing filler comprises at least one of a carbon black and a transparent filler.

12. The composite material according to claim 6, wherein said cross-linking agent comprises an amine.

13. The composite material according to claim 1, wherein said elastomer matrix comprises at least one elastomer and said thermosetting polymer comprises 10 percent to 20 percent by weight of said eleastomer.

14. The composite material according to claim 3, further including a reinforcing filling in powder form in said elastomer matrix.

15. the composite material according to claim 14, wherein said thermosetting resin includes a cross-linking agent.

* * * * *